Figure 1:
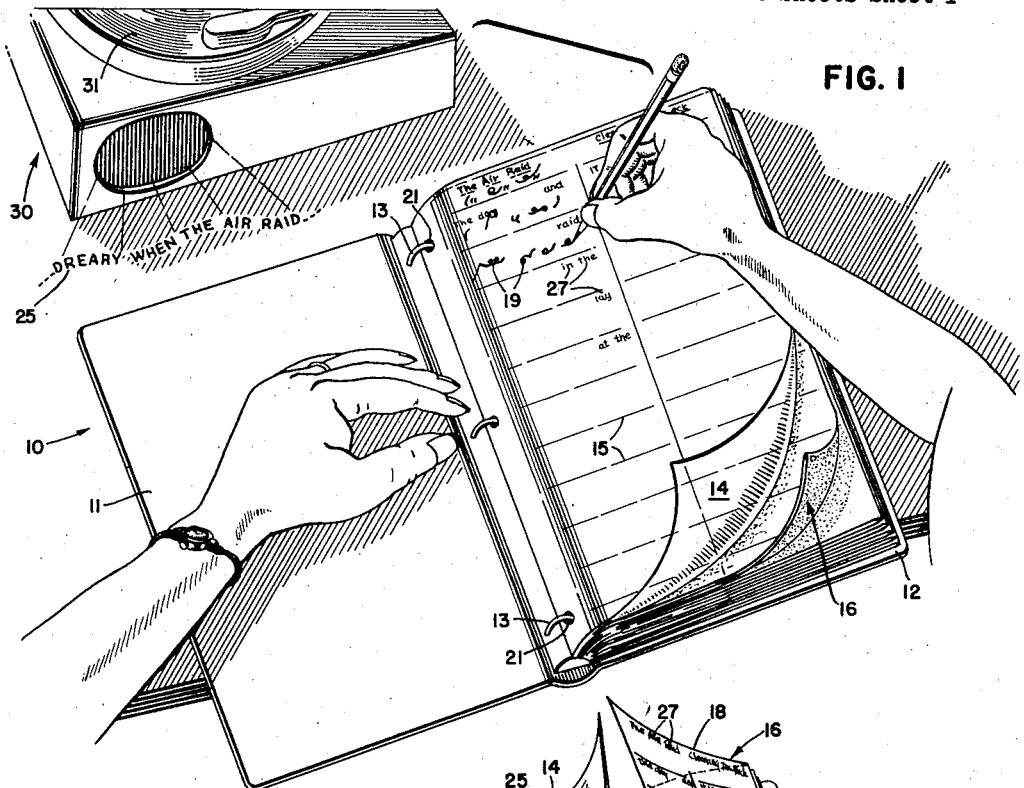

April 28, 1959 — A. BELL ET AL — 2,883,767
SHORTHAND PRACTICE MATERIALS
Filed Dec. 6, 1955 — 2 Sheets-Sheet 1

INVENTOR
ALAN BELL
STANLEY T. BELL
BY
ATTORNEYS

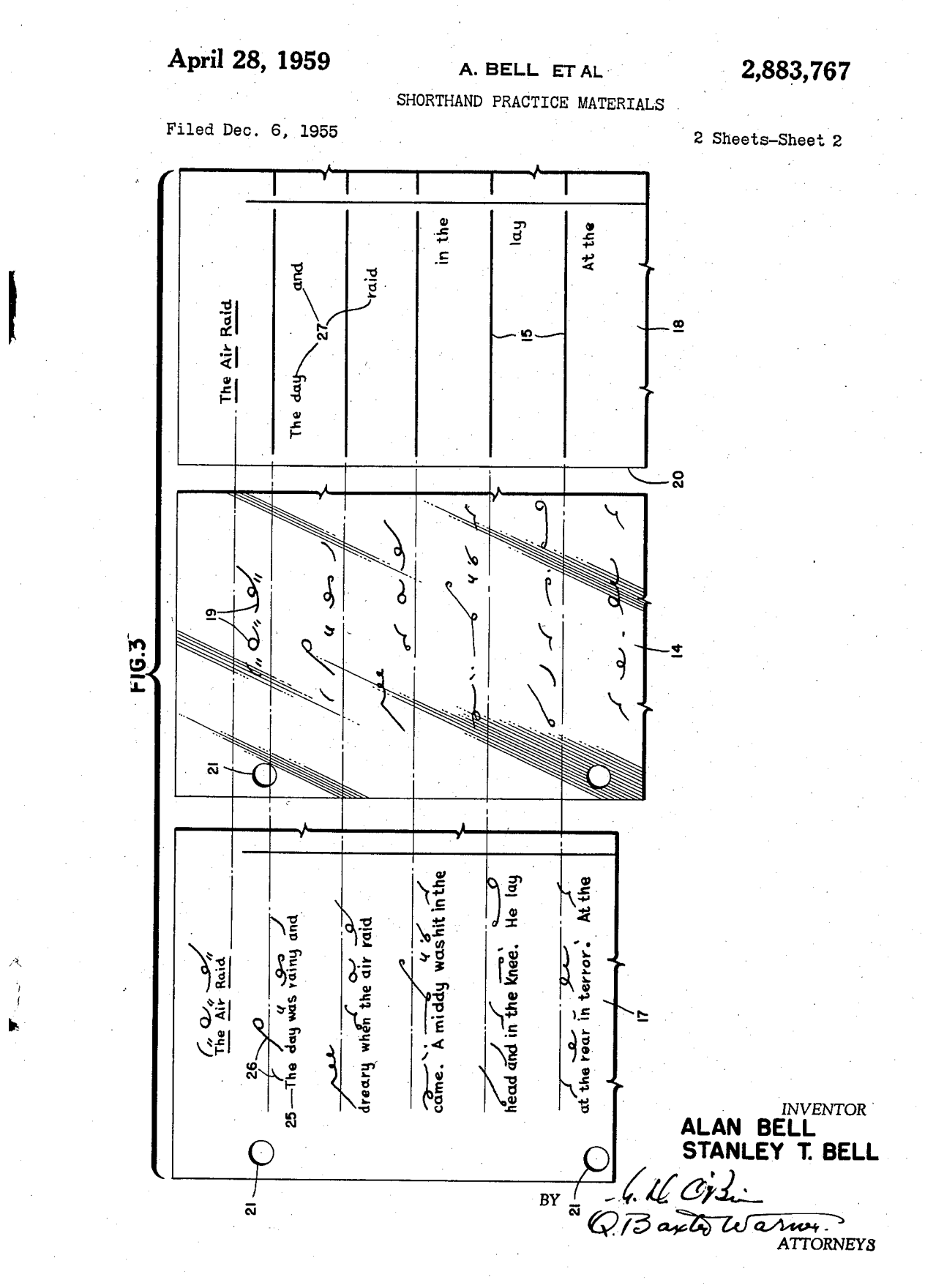

April 28, 1959     A. BELL ET AL     2,883,767
SHORTHAND PRACTICE MATERIALS
Filed Dec. 6, 1955     2 Sheets-Sheet 2

FIG. 3

INVENTOR
ALAN BELL
STANLEY T. BELL
BY
ATTORNEYS

United States Patent Office 2,883,767
Patented Apr. 28, 1959

2,883,767

SHORTHAND PRACTICE MATERIALS

Alan Bell and Stanley T. Bell, Washington, D.C.

Application December 6, 1955, Serial No. 551,392

2 Claims. (Cl. 35—35)

The invention relates to shorthand practice materials and more particularly relates to a text and practice book designed primarily for self-instruction in either shorthand or language such as a foreign language wherein a transparent scratch sheet for receiving a student's writing selectively overlies printed cue material or the printed copy and printed equivalent shorthand key or foreign language material and which is especially adapted for home-study refresher or indoctrination courses utilizing recordings or other audio presentation. Many prior art practice books used for similar purposes of facilitating home-study have been bulky and required removal from the book and reinsertion thereon of some of the sheets involved when a comparison of the student's work with a printed key was desired. This tended to misplace sheets, materially reducing the value of the book and students encountered difficulty in aligning written matter with the printed copy or key. Another very important objection to prior art devices was that they did not lend themselves readily to home or instructional study by oral presentation and such prior art devices necessitated visual study methods which were not as successful for purposes of rapidity of learning, memory retention of the learned processes and insurance that the instructional method taught the exact skills desired to be learned. An illustration of the prior art which eliminated the first of the enumerated disadvantages but did not adequately provide for the second enumerated disadvantage is Patent No. 2,455,353 for Copy and Practice Book issued December 7, 1948 to Stanley T. Bell, one of the coinventors herein, and prior Patent No. 2,360,328 for Shorthand Text Practice Book issued October 17, 1944 to Stanley T. Bell.

Accordingly, it is an object of this invention to provide a shorthand or language text and practice book wherein it is not necessary to remove any sheets from the binding means to either translate from the printed sheets or compare the written matter with a printed key or printed copy.

Another object of the invention is to provide a shorthand language practice book wherein the printed copy and printed shorthand or language equivalent may be properly placed with respect to an overlying transparent scratch sheet on which appears student's handwritten notes, without removing any sheets from the binding of the book.

Another aim of the invention is to materially reduce the bulk of self-instructing shorthand or language practice books without any reduction of the volume of practice matter therein.

Another purpose of the invention is to provide a self-instructing shorthand or language practice book suitable for home-study use by oral presentation which when finished by leafing through in one direction is ready for reuse by turning it over and leafing through in the other direction.

Another aim of the invention is to provide shorthand practice materials for study exercises in office terminology wherein text pages are interleaved with tissue sheets which overlie the text pages and wherein a student may translate orally communicated text material into shorthand, writing on the tissue or transparent sheets and wherein the pages are designed to permit the student to lay the tissue containing the shorthand writing over a shorthand key and printed copy plate in such manner that comparison can readily be made in a character-by-character comparison of shorthand notes with correctly written shorthand and with the language translation thereof.

Another object of the invention is to provide shorthand practice materials whereby a student may translate matter orally presented as from records on a phonograph, for example, writing on the tissue sheets and wherein the design of pages of printed material permits the student subsequently to lay the tissue containing the shorthand writing over a combined shorthand-language plate in such a manner that character-by-character comparison of shorthand notes with correctly written shorthand and with the language translation thereof may readily be effected.

Another aim of the invention is to provide shorthand practice materials which will be superior for study purposes by utilization of ear-hand techniques rather than eye-hand techniques formerly used.

Another object of the invention is to provide a shorthand practice material copy book wherein automation of stenographic practice can be effected with elimination of the necessity for the presence of an instructor and wherein ear-hand coordination may be utilized to the fullest possible extent.

Figure 2:
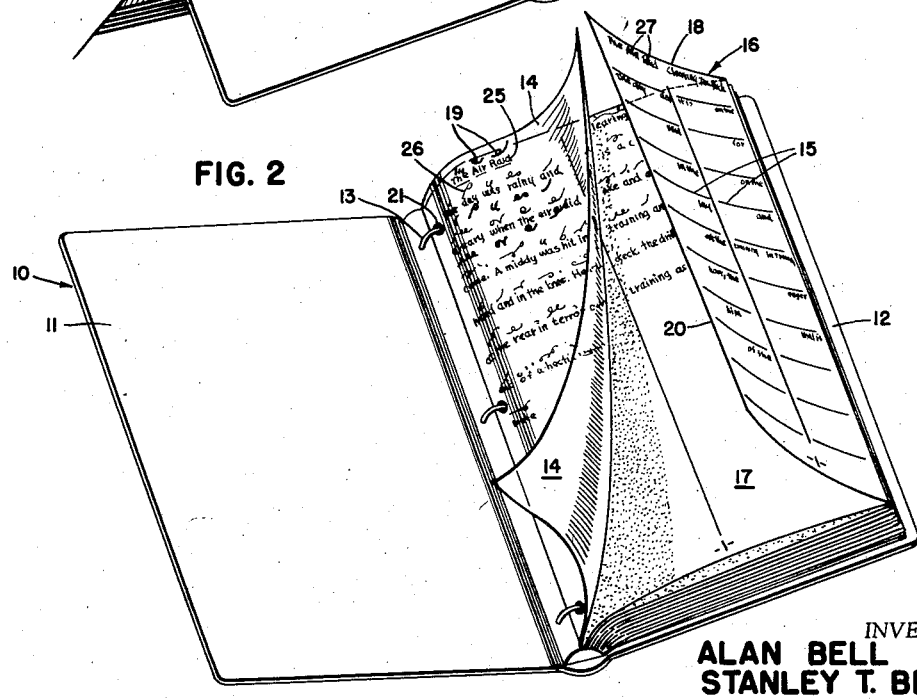

Other objects and many of the attendant advantages of this invention will be readily appreciated as the same becomes better understood by reference to the following detailed description when considered in connection with the accompanying drawings wherein:

Fig. 1 is a perspective view of a shorthand practice book and means for oral presentation of copy material illustrating a preferred embodiment of the invention and wherein the book is shown with the cover open and ready to receive the student's written shorthand symbols of dictated matter with the last word of each line shown as printed cue matter showing through the transparent scratch sheet;

Fig. 2 is a similar view with the transparent scratch sheet partly turned back and the printed cue sheet partly removed to show the printed shorthand key and printed copy equivalent on the following sheet; and Fig. 3 is an exploded view showing a side-by-side presentation of one practice material set of sheets removed from the book of Fig. 1 with portions of the sheets torn away for purposes of clarity of the showing and with the non-transparent sheets shown in separated condition.

Each practice book may consist of a plurality of sets of sheets of paper, each set composed of one transparent (or semitransparent) scratch sheet for receiving the student's written work, one opaque page of lines of shorthand key material and lines of printed copy and an opaque page with the cue language and spaced lines printed thereon. One of the opaque pages is bound in the book while the other is attached to or integral with the free end thereof and folds into the book, either over or under the bound page. As each sheet side of the opaque sheets may carry printed matter, a second transparent (or semitransparent) scratch sheet may be provided as the bottom sheet in each set, permitting reversal of the book to provide additional copy in the manner shown in aforementioned Patent No. 2,455,353.

While the practice book constituting the instant invention is adapted for general instruction it is particularly designed for home-study correspondence school work, as for example instruction in shorthand to naval personnel on sea duty. The course could consist of a series of practice books and phonograph records, which would be sent to the student who upon completion thereof, would return the book and phonograph records as evidence of his work. By replacing the transparent scratch sheets, the books would be ready for further service.

While the drawings disclose the invention as applied to a shorthand text and practice book, a language text and practice book would be arranged in the same manner with the foreign language substituted for the shorthand. The embodiment of the inventive article as disclosed in the accompanying drawings comprises a loose-leaf notebook 10 having a front cover 11, a rear cover 12 and rings 13 for holding the sets of sheets therein. Each set of sheets comprises a transparent scratch sheet 14 adapted to receive the student's handwritten shorthand characters and an opaque sheet 16. Sheet 16 carries both printed cue words 27 of the material to be transcribed by the student in shorthand and the printed copy 25 and shorthand key equivalent 26. The free half 18 of sheet 16 carries the cue words 27, while the fixed or book attached half 17 carries the printed copy 25 and printed key 26 on its upper or obverse side in a position such that when the free half or cue page 18 is folded back upon itself, the printed copy 25 and printed key 26 is in position to be compared with the student's writing 19 on the transparent sheet. When the sheet 16 is folded the free end 20 of the right half or free page 18 falls just short of the perforations 21 at the bound end of the left half or bound page 17 as shown in Fig. 1 permitting the ready removal of the folded portion 18 from the book. When in position to commence taking dictation from the phonograph recording or instructor the printed cue material 27 is uppermost and may be read through the overlying scratch sheet 14 upon which the student writes. Printed lines 15 are disposed on the right half 18 of sheet 16 in such manner that the student's transcription of symbols on the scratch sheet will occur immediately below the cue lines for a purpose to be later described. On the left hand or bound portion 17 of sheet 16 the copy matter 25 is printed with the cue (usually the last) words 27 of the right page 18 falling in superimposed position over the corresponding word of the copy when the two half sheets are folded together with the free half 18 over the bound half 17. The key translated shorthand notes 26 appears on the left hand page 17 immediately above the copy material so that ready comparison when the upper or right hand sheet is unfolded may be made between the student's shorthand notes 19, the translated copy 25, and the key 26 for correction purposes. Sheet 16 of course may be of one piece foldable as shown or it may be composed of two pieces joined together along the mating edge and in either case may be reinforced along the fold with tape or by other means.

Thus, in using the practice book, the cue material 27 and lines 15 are visible through the transparent sheet 14 and the student writes the shorthand equivalent in a vertical position relating to lines 15 which lines are spaced below the cue material 27. When it is desired to compare the written student's notes with the printed shorthand characters or key 26 on the left half 17 of sheet 16 or to compare the student's notes with the printed translation or copy 25 thereof, the free half 18 of sheet 16 is pulled out as shown in Fig. 2 and then may be either left dangling from the book or folded under the bound half or left half 17 until half sheet 18 lies flat under half sheet 17. The printed copy 25 then appears in the same vertical position the cue material 27 formerly appeared and the printed key 26 appears immediately above each line of the copy material 25, the student's shorthand notes appearing directly below the printed copy 25. The student may then compare his written work with the printed shorthand characters and with the printed copy material. The student may then turn to the next set of sheets and so progress through the book. The relationship of the lines is best illustrated in Fig. 3 of the drawings.

By utilizing means 30, the student may listen to a phonograph record play back or other oral presentation of the matter presented in printed copy form on half 17 of sheet 16. The student will accordingly write shorthand notes relating thereto on the scratch sheet on the printed lines 15 visible through the transparent sheet 14. The student may be guided as to when to terminate each line and as to when to begin by the cue words 27 on the lines so that later alignment vertically and horizontally of printed key 26, printed copy 25, and transcribed characters 19 may readily take place. Upon completion of the lines of copy, half 18 will be reversely bent along the line joining it to half 17 and folded back thereunder to lie flat or to protrude outwardly from the practice book. The transparent sheet 14 will meanwhile have been withdrawn and then will be placed back so it lies immediately above the face of half 17. Thus, in successive lines, appear through the transparent sheet, the printed key material 26, directly thereunder the printed copy matter 25 and directly under the printed copy matter 25 will appear the student's notes 19 placed on the transparent sheet or tissue so that all three may be compared or so that the key and the student's notes may be compared for accuracy.

It may be readily seen that sheet 16 may be printed on both sides as suggested in above enumerated prior Patent No. 2,455,353 heretofore mentioned, in such manner that by provision of an extra transparent or semitransparent scratch sheet (not shown) inserted under the sheets 14 and 16 in order, the book may be turned over and the extra transparent sheet (not shown) and sheet 16 used to receive and compare the student's written shorthand and the copy and key. The cue words which would then appear on the reverse side in the manner suggested in Patent No. 2,455,353 would be utilized by the student as before from oral dictation and when the student leafs through the book in the other direction appropriate material similar to the copy and key appearing on the face of sheet 17 may be printed on the reverse side so that on turning over the shorthand book it may be leafed through in the opposite direction to present additional matter for home or correspondence study. Upon finishing the book in both directions the transparent sheets may be removed and new ones inserted, or in the alternative several such transparent sheets could be originally placed in the book in lieu of each transparent sheet described hereinbefore in which case the transparent sheet adjacent the printed matter would be used, the used sheets being removed after finishing the complete exercise and the set of transparent sheets next adjacent the printed matter being then used.

While a loose-leaf practice book is disclosed, a permanently bound book may be used, in which case additional transparent or semitransparent sheets may be bound with each of those described to permit the book to be used more than once.

In operation the practice book would be opened to a set of the materials with the tissue or transparent sheet uppermost followed directly thereunder by the face of half sheet 18 which is folded above and superimposed upon now obscured half sheet 17, half sheet 17 containing the copy 25 and the key material 26. Words would audibly emanate at desired speed from a recording machine 30 containing a recorded transcription 31 of the copy material 25. The student would mark the appropriate symbols below the lines containing the cue words and on the ruled lines on sheet 18, the actual marking occurring on transparent scratch sheet 14 in that position. On hearing each of the cue words at the end of a line such as "and," "raid," "in the," as shown the student would have an indication to proceed to the following line.

After completely copying down in shorthand, such as Gregg shorthand, the passage on the scratch sheets, the sheet 18 would be unfolded from sheet 17 with the transparent tissue being meanwhile held up to permit passage thereunder. The student may then compare his shorthand notes with the shorthand key 26 on half sheet 17 which key appears immediately superimposed above the printed copy 25. If desired a clean white sheet of paper can be inserted between the tissue sheet containing the student's handwritten shorthand and the printed text so that he may read back his notes. In the event of difficulty in reading back his notes or doubt as to his correct reading of particular words or phrases, the loose clean white sheet may be removed and the proper words or phrases noted in the printed copy. These may be encircled, preferably in red pencil and can be studied if desired. In the comparison of the student's notes with the correctly written shorthand as stated the sheet which contains the printed cue lines is unfolded so that the tissue sheet on which the student's notes were written will overlay the shorthand plate which has now been exposed to view and the handwritten matter on the tissues will fall in place under the correctly written outlines. At this point comparison of the student's notes may be made with those of the shorthand key. Concentration on those portions of the notes which had been circled as being doubtful during transcription can be made at this time. The student may correct his errors by writing in the correct characters, for example, in a shorthand notebook and can study the principles involved.

The invention disclosed suggests that if desired, the cue words may be omitted from half sheet 18 leaving only the printed ruled lines remaining. In this case, the transcription may be read over the record or other auditory device with a symbol such as a click or a bell representing the time at which the student should go to the next line. However, this method has an important disadvantage in that vertical alignment may not be true in comparing the student's written material with the copy and key after writing has finished and the comparison for accuracy will be much slower and more difficult.

A means has been shown in the foregoing description to enable oral dictation and word for word, symbol for symbol and word-symbol comparison to be effected in a manner to provide automation of a process of learning stenography without the necessity for a human instructor being involved, and wherein ear-hand coordination skill necessary to be developed may be readily effected, thus doing away with the extra step and transition necessitated by prior art methods wherein eye-hand coordination was used as a method of teaching skills which require ear-hand coordination in practice.

Obviously many modifications and variations of the present invention are possible in the light of the above teachings. It is therefore to be understood that within the scope of the appended claims the invention may be practiced otherwise than as specifically described.

What is claimed is:

1. A combination shorthand text and practice book comprising a plurality of sets of sheet materials, each set consisting of a transparent sheet for receiving written shorthand characters and an opaque sheet, said opaque sheet having a bound portion and a free portion, said bound portion having a printed key consisting of lines of words with a shorthand symbol disposed above each word of said lines of words and equivalent thereto, said free portion having a printed cue consisting of cue words of a number substantially less than the number of words in said lines of words and equivalent to words disposed at the beginning and end of said lines of words, said free portion being foldable against said bound portion for exposing said cue words such that the cue words are visible through said transparent sheet and for completely obscuring said lines of words and shorthand symbols such that the lines of words and shorthand symbols are not visible through said transparent sheet during a test whereupon said shorthand characters representative of said words may be written on said transparent sheet in accordance with audible cue designations for comparison with said shorthand symbols on the bound portion when said free portion is not overlying said bound portion.

2. A combination shorthand text and practice book comprising a plurality of sets of sheet materials, each set consisting of a transparent sheet for receiving written shorthand characters and an opaque sheet, said opaque sheet being approximately twice the width of said transparent sheet and provided with a bound portion and a free portion, said bound portion having a printed key consisting of vertically spaced lines of words with a shorthand symbol disposed above each word of said lines of words and equivalent thereto, said free portion having a printed cue consisting of a plurality of longitudinally and vertically spaced cue words, the longitudinal spacing of which is substantially greater than the longitudinal spacing of the words in said lines of words and of a number substantially less than the number of words in said lines of words and equivalent to words disposed at the beginning and end of said lines of words, said free portion being foldable against said bound portion for exposing only said cue words as said shorthand characters are written on the transparent sheet in accordance with audible signals.

References Cited in the file of this patent

UNITED STATES PATENTS

| 544,714 | Yorke | Aug. 20, 1895 |
| 2,455,353 | Bell | Dec. 7, 1948 |

FOREIGN PATENTS

| 396,518 | France | Jan. 29, 1909 |
| 895,834 | France | Apr. 11, 1944 |
| 231,845 | Switzerland | Apr. 15, 1944 |

OTHER REFERENCES

Ser. No. 418,491, Routin (A.P.C.), published Apr. 27, 1943.